March 24, 1964     J. S. PERRYMAN     3,125,889

SPRING CLUTCH AND CONTROL MEANS

Filed Sept. 29, 1961     2 Sheets-Sheet 1

INVENTOR.
JOHN S. PERRYMAN
BY
William V. Ebs
HIS ATTORNEY

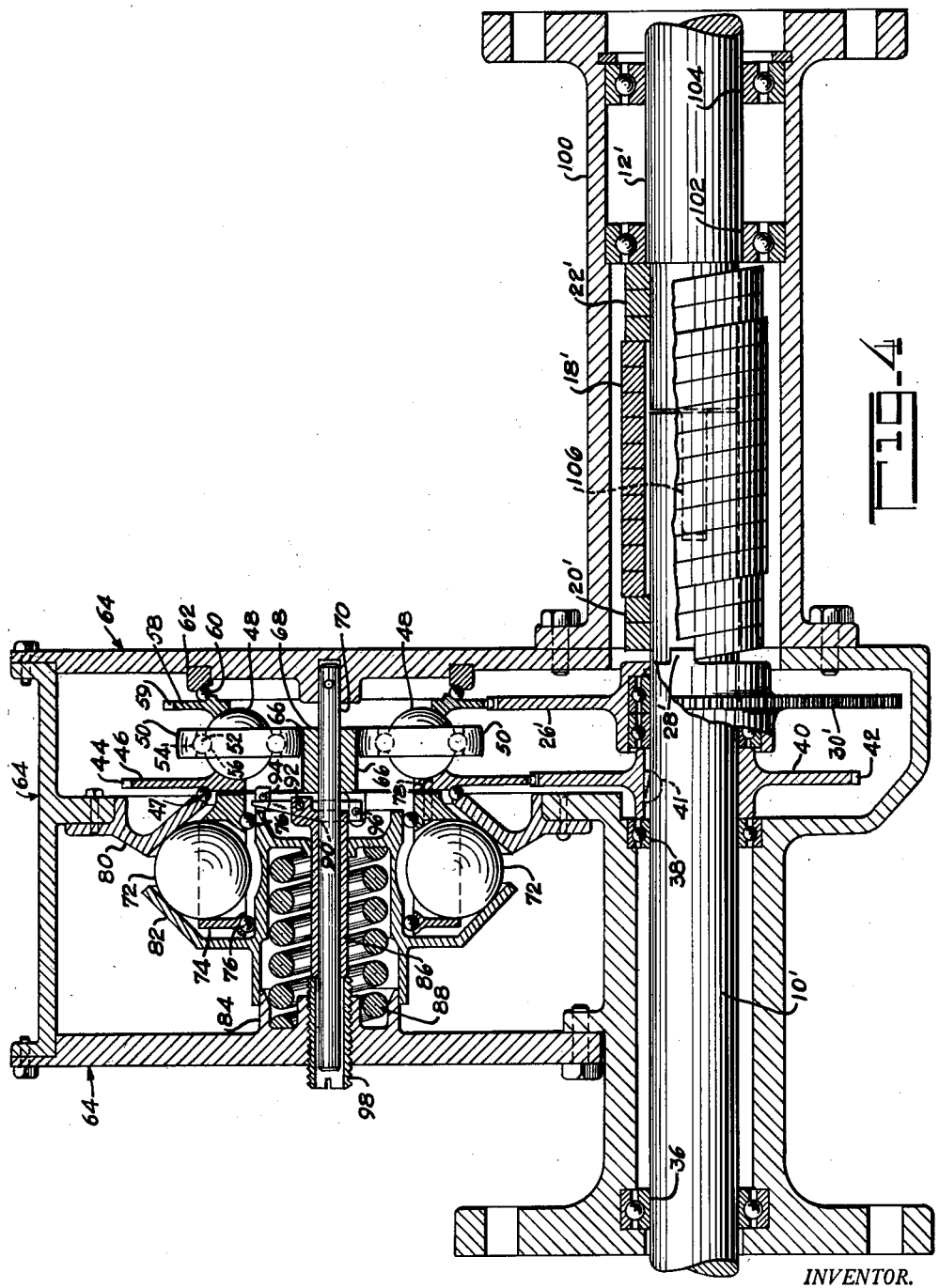

United States Patent Office 3,125,889
Patented Mar. 24, 1964

3,125,889
SPRING CLUTCH AND CONTROL MEANS
John S. Perryman, Fayson Lakes, N.J., assignor to Curtiss-Wright Corporation, a corporation of Delaware
Filed Sept. 29, 1961, Ser. No. 141,896
5 Claims. (Cl. 74—111)

My invention relates to a spring clutch and control means therefor.

Spring clutches are scientifically designed, precisely machined devices, by means of which power sources and complementary equipment may be connected and disconnected. Most commonly a spring clutch consists of a helical spring and two drums of approximately equal size which the spring bridges and couples or uncouples. The drums and spring may be so arranged that the spring grips the drum surfaces when contracted and loosens its grip when expanded, or the arrangement may be such that the spring grips when expanded and loosens when contracted.

When the spring in a conventional spring clutch is actuated to couple an input to an output shaft the output shaft is caused to rotate at the speed of the input shaft. When the spring is actuated to uncouple the shafts the output shaft assumes a rest position. Once the spring has been actuated to couple the shafts, power is transmitted from the input to the output shaft as though the shafts were integral and cannot be controlled through the clutch.

A prime object of this invention is to provide improved mechanical transmission wherein a spring clutch is operable to determine output speed or output power.

The mechanism of the invention includes co-axial input and output shafts which are bridged by a helical spring having at least one portion in contact with the input shaft and another portion in contact with the output shaft. Motion of the input shaft in one direction enforces tight frictional engagement of coils of the spring with the input and output shaft from time to time and a driving impetus is imparted by the input shaft to the output shaft through the spring at such times. Rotation of the output shaft at the speed of the input shaft is, however, prevented by an actuating element disposed in the path of the end of the spring portion which contacts the input shaft and rotated more slowly than the input shaft. This actuating element, when engaged by the spring end, causes the spring to loosen its grip on the input shaft, whereupon the input and output shafts uncouple. When the shafts uncouple, the output shaft decelerates and almost immediately the spring is again caused to tighten its grip on the input and output shafts by the resulting relative movement of the shafts and thereby re-establish the driving connection. There is a cyclic coupling and uncoupling of the input and output shafts during the operation of the mechanism. The output shaft is rotated by recurrent applications of torque exerted by the input shaft through the spring, and the output shaft rotates at the speed of the actuating element.

Referring to the drawings:

FIG. 4 is a vertical longitudinal sectional view showing a speed changer which embodies features of the invention.

Figure 1:
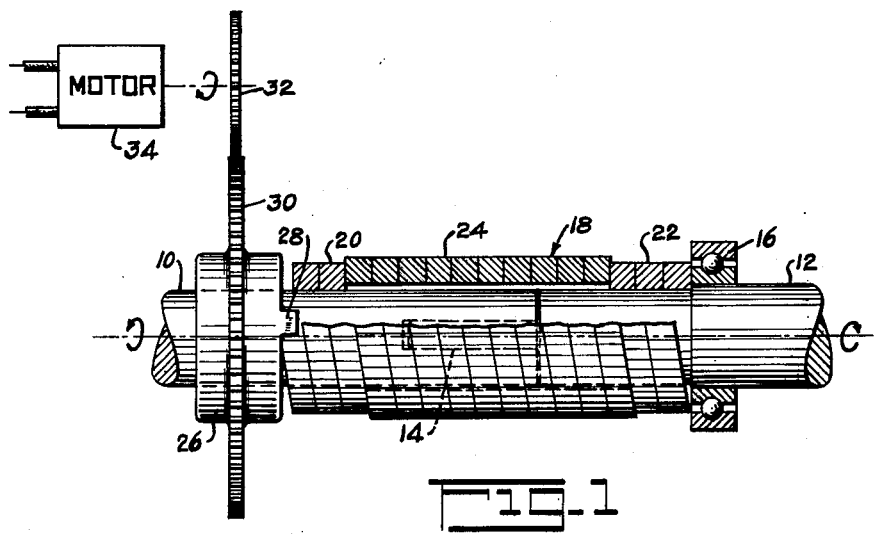
FIG. 1 is an elevational view partly in section, showing a spring clutch and control means therefor, according to the invention.
Figure 2:
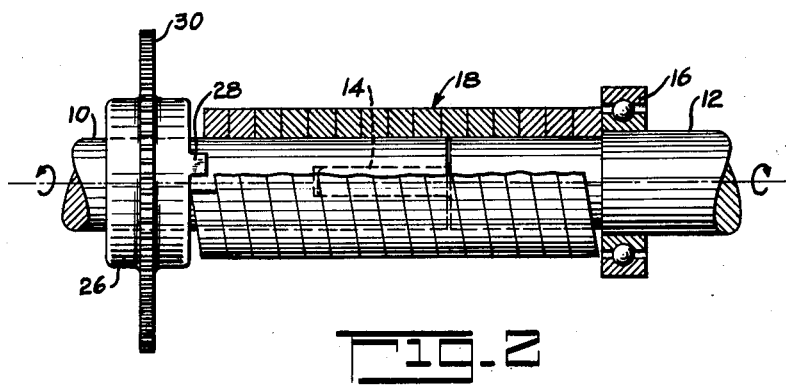
FIG. 2 is a view showing the spring clutch of FIG. 1 as it appears when the spring is contracted.

In the drawings (see FIGS. 1 and 2) reference character 10 designates an input shaft which is co-axial with an output shaft 12, the shafts being equal in diameter. Output shaft 12 is piloted in the input shaft at 14 and is rotatably supported in bearing 16. Bearings supporting the shaft 10 are not shown in the drawing. A helical spring 18 bridges the input and output shafts. The spring is so constructed that end coils shown at 20 and 22 have a lesser diameter than the intermediate coils 24 of the spring. The free diameters of the end coils 20 and 22 are less than the diameters of the input and output shafts so that the end coils frictionally engage the surfaces of the respective shafts. The diameter of the intermediate coils 24 of the spring preferably slightly exceeds the diameter of the shafts.

The input shaft 10 rotatably supports a member 26. The member 26 includes an actuating element 28 which, from time to time, engages the end of the spring in contact with the input shaft. The member 26 is provided with a gear 30. The gear 30 meshes with a gear 32 which is driven by a motor 34 at a selected speed. The member 26 is driven by the motor in the same direction as the direction of rotation of the input shaft 10 and the output shaft is caused to rotate in the direction of the rotation of input shaft 10 at a speed determined by the speed of the actuating element providing the actuating element is not rotated at a greater speed than that of the input shaft. By suitably controlling the motor, any speed may be determined for the output shaft within the range, the limits of which are zero r.p.m. and the r.p.m. of the input shaft.

In the absence of any rotation of member 26 and the actuating element 28 thereon, but with shaft 10 rotating, the extreme end of the coil 20 abuts against actuating element 28 and the intermediate coils 24 of the spring are slightly spaced from the surfaces of the input and output shafts. The shafts are, therefore, uncoupled. Assume that the motor is energized to rotate member 26 and element 28 at a speed less than that of the input shaft. Actuating element 28 moves away from the extreme end of coils 20 leaving the spring free to contract. By reason of the frictional engagement of coils 20 and 22 with the input and output shaft respectively and the rotation of shaft 10 relative to shaft 12, the spring is caused to contract, that is, the coils of the spring including 24 are wound into tight frictional engagement with shafts 10 and 12. The spring couples shaft 10 to shaft 12 and a driving impetus is imparted by shaft 10 to the shaft 12 through the spring 18. The spring, however, rotates with the shaft and the extreme end of coil 20 quickly catches up to and engages actuating element 28 whereupon the intermediate coils 24 of the spring are caused to loosen their grip upon the input and output shafts and assume their initial state. The shafts uncouple and the output shaft decelerates. The actuating element again moves away from the extreme end of the coil 20 and due to the deceleration of shaft 12 and resulting relative motion of the input and output shafts, the spring is once again caused to contract and grip both shafts. There is a periodic coupling and uncoupling of the shafts, the output shaft having a driving torque recurrently applied to it by the input shaft through the spring. The output shaft is permitted to rotate only at the speed of the actuating element, the speed being so limited by the engagement of the spring end with the actuating element.

Figure 3:
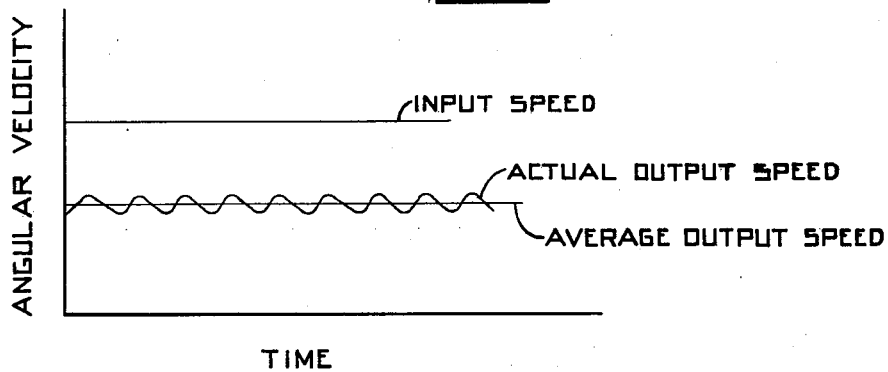
FIG. 3 is a plot of angular velocity against time showing a constant angular velocity for the actuating element and the resultant velocity of the output shaft.

The manner in which the mechanism functions in changing a constant input speed to some other constant output speed of less magnitude is graphically illustrated in FIG. 3 wherein the upper horizontal line represents the speed of the input shaft and the lower wavy line represents the speed of the output shaft. The output speed varies periodically due to the cyclic coupling and uncoupling of the input and output shafts. The variations are, however, slight and average out to provide the average constant speed represented by the lower horizontal line which speed corresponds to the speed of the actuating element 28. The magnitude of the average constant speed depends upon the speed selected for the motor.

The spring clutch of the invention may be controlled to convert a variable speed to a constant speed, and FIG. 4 shows a mechanism in which the clutch is so utilized. Parts of the mechanism of FIG. 4 corresponding to parts shown in FIGS. 1 and 2 bear reference characters like those applied to the corresponding parts, a prime (') mark, however, having been added to such reference characters in FIG. 4.

In FIG. 4 reference character 10' denotes an input shaft which as shown is rotatably mounted in bearings 36 and 38. Shaft 10' has a gear 40 keyed thereon at 41 for rotation with the shaft. The teeth 42 of the gear 40 meshes with the teeth 44 of a race 46 rotatably mounted on balls 47. The race 46 rotates as the shaft 10' rotates at a speed proportional thereto. Race 46 is the input race of a speed changer which is of the type shown, for example, in Patent #2,883,883 for Variable Speed Transmission of C. W. Chillson, issued April 28, 1959. The race 46 engages and rotates a plurality of speed changing balls 48, each such ball 48 is rotatably mounted in a shroud race 50 that surrounds a plurality of small balls 52 which ride in a groove 54 of the race and a groove 56 in the ball 48. The balls 48 engage and rotate an output race 58 which as shown is mounted on balls 60 disposed between the rotatable race 58 and a race 62 affixed in housing 64. The race 58 includes gear teeth 59 which mesh with the gear teeth 30' on member 26'. Each of the bearing shrouds 50 is connected by a spring 66 to a member 68 which is slidably mounted upon a shaft 70 affixed in the housing 64. Each of the springs 66 attaches at opposite ends to the shroud race 50 and member 68 respectively. The springs tend to lie flat on surfaces of the member 68 and exert a biasing force on the race shrouds 50 tending to tilt the shrouds and balls 48 about an axis through the center of the balls and perpendicular to the plane of the drawing such that the portions of the shrouds closest to the shaft 70 are urged toward the left. Member 68 is also urged by the springs 66 toward the left as viewed in the drawing.

The speed changer is controlled according to the operation of a plurality of fly weights 72 that mount in a rotatable cage 74 which as shown is supported on ball bearings 76. The cage 74 is pinned at 78 to the race 46 and is rotated thereby at a speed proportional to the speed of the input shaft 10'. As shown, the balls 72 engage a caging element 80 which is affixed to the housing 64 and a caging member 82 which is slidably mounted on a boss 84 of the housing 64 and a tubular member 86. The slidable caging member 82 is urged to the right by a spring 88. The balls 72 are revolved by the cage 74 about the axis of rotation of the cage. The balls move outwardly when speed increases to react against the caging member 82 and force it to the left against the bias of spring 88. When speed decreases the balls fall inwardly and spring 88 acts to move caging member 82 to the right. The position of the caging member 88 at any particular time depends upon the speed of revolution of the balls 72 as determined by the speed of input shaft 10'.

Tubular member 86 has a lever 90 pivotally mounted thereon at 92. When the caging member 82 is moved to the left by reason of an increase in the speed of shaft 10', the lever 90 is pivoted about its pivotal axis on tubular member 86 in a counterclockwise direction by the force exerted on the upper end of the lever by a pin 94 affixed to caging member 82. The other end of the lever 90 pivotally connects at 96 with member 68 so that as lever 90 moves counterclockwise the member 68 is urged to the right. Member 68 acts through the springs 66 to tilt the race shrouds 50 and balls 48 in a direction corresponding to rightward movement of the portions of the shrouds attached to the springs. When the speed of the input shaft decreases the fly weights 72 fall inwardly and the speed changer balls 48 are caused to tilt in the opposite direction. The ratio of the speed of the output race 58 to the speed of race 46 of the speed changer is adjusted by the tilting of balls 48 in inverse proportion to the change in the speed of rotation of the shaft 10', and the speed of race and member 26' are thereby maintained constant. The position of the pivotal axis on tubular member 86 may be adjusted by means of a screw 98 which is threaded in the housing 64. This screw bears against the left end of tubular member 86 and may be screwed into the housing to move the pivotal axis at 92 to the right or may be screwed out of the housing permitting the tubular member to be moved to the left by the action of springs 68. By adjusting the position of the pivotal axis at 92 in this manner a selected speed (less than the speed of input shaft 10') is determined for member 26'.

The member 26' includes the actuating element 28' which is engageable with a spring 18' having end coils 20' and 22' in interference fit with the input shaft 10' and output shaft 12', and intermediate coils of slightly larger diameter. As shown in the drawing, the shafts 10' and 12' extend within the housing 100. The output shaft 12' is mounted within the housing 100 on bearings 102 and 104 and is piloted at 14' in the input shaft. With the member 26' rotated at the selected constant speed, the output shaft is controlled to the same constant speed through the action of the spring 18' and actuating element 28' in the manner described in connection with description of the mechanism of FIGS. 1 and 2.

The fly weights might be eliminated from the mechanism of FIG. 4 and provision made for adjusting the speed changer manually rather than automatically. A preferable use for the resulting device would be that of changing a constant input speed to a desired output speed of lesser magnitude, that is, it could be used to particular advantage in the manner of the mechanism of FIGS. 1 and 2. The resulting device might also be used to control the amount of power applied to a load. This could be accomplished, for example, by stroking the speed changer according to speed and torque at the output shaft in such manner as to control power to a desired schedule.

While I have shown and described my invention, it is to be understood that various modifications and changes may be made, and that it may be applied in numerous forms. The scope of the invention may be ascertained by reading the appended claims.

I claim:

1. A power transmitting device comprising an input and an output shaft; a spring concentric with the input and output shafts having end portions which have an interference fit with the shafts, the spring being so wound that upon rotation of the input shaft in a predetermined direction relative to the output shaft, the one spring end in interference with the input shaft is moved by the input shaft in said predetermined direction relative to the opposite end thereof to tighten the coils of the spring against the input and output shafts whereupon driving torque is imparted by the input shaft through the spring to the output shaft; an actuator; and means for rotating the actuator in the direction of rotation of the input shaft at less speed than the input shaft; said actuator including a portion which extends into the path of said one spring end for engagement thereby and which when engaged relaxes the spring to interrupt the transmission of driving torque to the output shaft such that output shaft speed may drop below the speed of the actuator and the actuator move out of engagement with said one spring end to permit the coils of the spring to tighten against the shafts and again transmit torque from the input shaft to the output shaft.

2. A power transmitting device comprising an input and an output shaft of equal diameter; a spring concentric with the input and output shafts having end portions which have an interference fit with the shafts and having an intermediate portion with a diameter at least as great as the diameter of the input and output shafts, the spring being so wound that upon rotation of the input shaft in a predetermined direction relative to the output shaft, the one spring end in interference with the input shaft is moved by the input shaft in said predetermined direction relative to the opposite end thereof to tighten the coils of the spring against the input and output shafts whereupon driving torque is imparted by the input shaft through the spring to the output shaft; an actuator; and means for rotating the actuator in the direction of rotation of the input shaft at less speed than the input shaft; said actuator including a portion which extends into the path of said one spring end for engagement thereby and which when engaged relaxes the spring to interrupt the transmission of driving torque to the output shaft such that output shaft speed may drop below the speed of the actuator and the actuator move out of engagement with said one spring end to permit the coils of the spring to tighten against the shafts and again transmit torque from the input shaft to the output shaft.

3. A power transmitting device comprising an input and an output shaft; a spring concentric with said shafts having an intermediate portion separated from the shafts and opposite end portions in contact with the input and output shafts respectively, the spring being so wound that upon rotation of the input shaft in a predetermined direction relative to the output shaft, the one spring end in interference with the input shaft is moved by the input shaft in said predetermined direction relative to the opposite end thereof to tighten the coils of the spring against the input and output shafts whereupon driving torque is imparted by the input shaft through the spring to the output shaft; an actuator; and means for rotating the actuator in the direction of rotation of the input shaft at less speed than the input shaft; said actuator including a portion which extends into the path of said one spring end for engagement thereby and which when engaged relaxes the spring to interrupt the transmission of driving torque to the output shaft such that output shaft speed may drop below the speed of the actuator and the actuator move out of engagement with said one spring end to permit the coils of the spring to tighten against the shafts and again transmit torque from the input shaft to the output shaft.

4. A power transmitting device comprising an input and an output shaft, a helical spring concentric with said shafts having intermediate coils of predetermined diameter spaced from the shafts and opposite coils of less diameter in contact with the input and output shafts respectively, the spring being so wound that upon rotation of the input shaft in a predetermined direction relative to the output shaft, the one spring end in interference with the input shaft is moved by the input shaft in said predetermined direction relative to the opposite end thereof to tighten the coils of the spring against the input and output shafts whereupon driving torque is imparted by the input shaft through the spring to the output shaft; an actuator; and means for rotating the actuator in the direction of rotation of the input shaft at less speed than the input shaft; said actuator including a portion which extends into the path of said one spring end for engagement thereby and which when engaged relaxes the spring to interrupt the transmission of driving torque to the output shaft such that output shaft speed may drop below the speed of the actuator and the actuator move out of engagement with said one spring end to permit the coils of the spring to tighten against the shafts and again transmit torque from the input shaft to the output shaft.

5. A power transmitting device comprising an input and an output shaft; a spring concentric with said shafts having end portions in contact with the input and output shafts respectively, the spring being so wound that upon rotation of the input shaft in a predetermined direction relative to the output shaft, the one spring end in interference with the input shaft is moved by the input shaft in said predetermined direction relative to the opposite end thereof to tighten the coils of the spring against the input and output shafts whereupon driving torque is imparted by the input shaft through the spring to the output shaft; an actuator; and means including an electric motor for rotating the actuator in the direction of rotation of the input shaft at less speed than the input shaft; said actuator including a portion which extends into the path of said one spring end for engagement thereby and which when engaged relaxes the spring to interrupt the transmission of driving torque to the output shaft such that output speed may drop below the speed of the actuator and the actuator move out of engagement with said one spring end to permit the coil of the spring to tighten against the shafts and again transmit torque from the input to the output shaft.

References Cited in the file of this patent

UNITED STATES PATENTS

| | | |
|---|---|---|
| 2,355,686 | Swift | Aug. 15, 1944 |
| 2,886,985 | Meyer | May 19, 1959 |
| 2,939,329 | Doerries | Jan. 7, 1960 |
| 3,048,050 | Perryman | Aug. 7, 1962 |